Feb. 23, 1943.     E. G. JOHANSSON     2,311,758
ELECTRICAL FITTING
Filed March 23, 1942
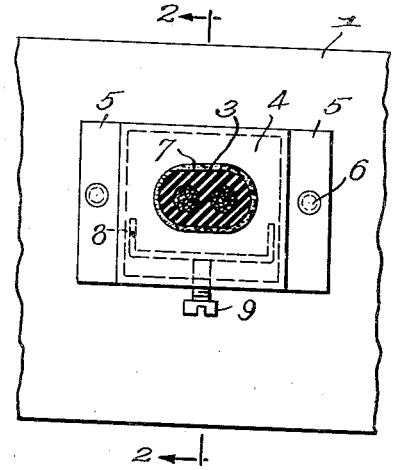
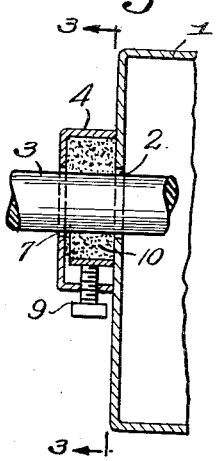
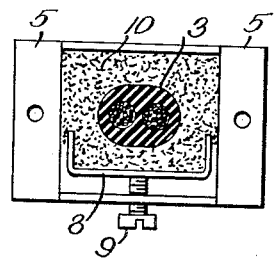
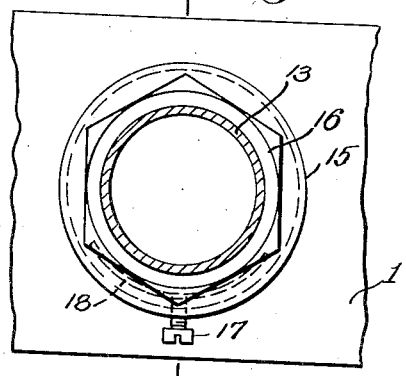
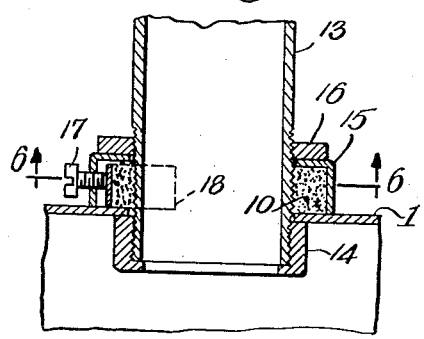
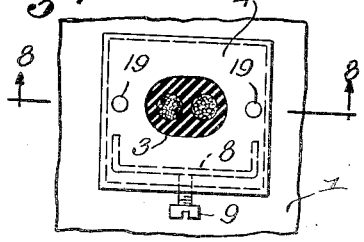
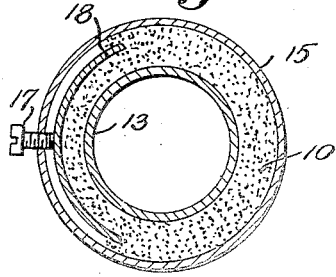
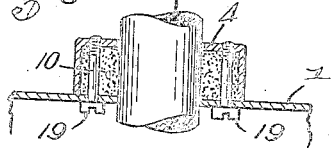

Patented Feb. 23, 1943

2,311,758

UNITED STATES PATENT OFFICE 2,311,758

ELECTRICAL FITTING

Ernest G. Johansson, Belmont, Mass., assignor to Anchor Manufacturing Company, Boston, Mass., a corporation of Massachusetts Application March 23, 1942, Serial No. 435,811

6 Claims. (Cl. 174—65)

In the electrical art switch boxes or other electrical connection boxes must often be installed outdoors or in other exposed places such that all openings through which moisture might enter the box should be sealed. It is thus necessary to seal the crevice between the electrical conduit or cable which enters the box and the edge of the opening in the box through which the cable or conduit passes, particularly if the conduit or cable enter from the top as it frequently does.

Objects of the present invention are to provide a watertight fitting which is simple and economical in construction, which is reliable and durable in use and which can be applied quickly and easily when the box and conduit or cable are interconnected together.

According to the present invention the sealing means comprises a cup having an opening in its bottom through which the conduit or cable is adapted to pass, the cup being dimensioned to provide a space surrounding the cable or conduit inside the cup to receive sealing compound. Means are provided for attaching the cup to the box with the lip or rim of the cup seating against the box, and within the cup is a compressor plate extending for the most part substantially parallel to a portion of the inner face of the wall of the cup. A screw or equivalent means is provided for forcing the compressor away from said portion of the inner face of the cup thereby to compress the sealing compound snugly around the cable or conduit and against the box so as to seal all crevices between the cable or conduit and the box. The cup may have any desired shape, such as circular or rectangular, and at its lip or rim the cup may have one or more flanges adapted to seat against the box. While the cup may be arranged inside of the box, it is usually preferable to locate it outside of the box. In some cases, e. g., when the cup is applied outside of the box to a cable or conduit entering the box at the bottom, the cup is in upright position, but in other cases, e. g., when the cup is applied outside the box to a cable or conduit entering the box from the top, the cup is in inverted position with its bottom uppermost. When the cup is provided with flanges, it is preferably secured to the box by rivets or screws extending through the flanges. When using screws, whether the screws extend into the aforesaid flanges or into the bottom of the cup, they preferably thread into the cup from the inside of the box so that they cannot be removed after the box has been sealed or locked. When the fitting is used with rigid conduit, the cup may be clamped against the box by a nut threaded on to the conduit outside of the box in cooperation with the usual bushing threaded on the end of the conduit inside of the box.

For the purpose of illustration typical embodiments of the invention are shown in the accompanying drawing in which—

Fig. 1 is a plan view showing a cable in transverse section and portions of the box broken away;

Fig. 2 is a section on line 2—2 of Fig. 1;

Fig. 3 is a section on line 3—3 of Fig. 2;

Fig. 4 is a view similar to Fig. 1 illustrating another embodiment;

Fig. 5 is a section on line 5—5 of Fig. 4;

Fig. 6 is a section on line 6—6 of Fig. 5;

Fig. 7 is a view similar to Figs. 1 and 4 showing still another embodiment; and

Fig. 8 is a section on line 8—8 of Fig. 7.

The particular embodiment of the invention shown in Figs. 1 to 3 comprises a box 1 having an opening 2 properly shaped to receive an insulated cable 3 comprising two conductors. This cable may be of any conventional type, including in some instances an internal layer of thin metal; an outer metallic armor of helical windings of metal ribbon, braided metal ribbon or wire, etc., as well as layers and/or wrappings of suitable insulating material. In this case the cup 4 is rectangular in shape and has flanges 5 extending outwardly from its lip or rim along two opposite sides, the flanges being secured to the box by means of rivets 6. In the case of two-conductor cable which is substantially oval in cross section, as shown in Figs. 1 to 3, the openings 2 and 7 in the box and cup respectively are similarly shaped to fit closely around the cable. Extending along and substantially parallel to the inner face of the cup at one side thereof (the bottom side in the drawing) is a compressor plate 8 having its ends turned inwardly as shown in Figs. 1 and 3. Threaded through the aforesaid side of the cup is a screw 9 for forcing the plate 8 inwardly. The cup is of such dimension as to provide a space or chamber between the conduit and the side walls of the cup and in this space or chamber is disposed suitable waterproof sealing compound (preferably plastic) such as the material known as Duxseal, made by Johns-Manville Company.

In installing the fitting illustrated in Figs. 1 to 3, the cup is filled with sealing compound, except for a central opening large enough to receive the conduit—the screw 9 having first been threaded outwardly so that the compressor plate 8 is in retracted position. While the sealing compound may be applied to the cup at the time the parts are installed, it is preferably applied in the process of manufacturing the connector. When cable is to be used, the cup is preferably first secured to the box. The end of the cable is then pushed through the cup and through the opening 2 and its inner end and is secured against movement. After the cable has been secured in position, the screw 9 is threaded inwardly to compress the sealing compound 10 around the cable and against the outer face of the box, thereby to seal the crevice between the cable and the edge of opening 2.

While in Figs. 1, 2 and 3, a substantially oval cable is illustrated, the same fitting may be employed for cable of other cross-section, for example, circular. Preferably, though not necessarily, the opening 7 in the cup and the opening 2 in the box are similar in contour to the cable. Moreover, while the fitting of Figs. 1, 2 and 3 is shown in association with a cable, it is also applicable, without change, to a rigid conduit.

In Figs. 4 to 6 the fitting is shown as applied to a standard conduit 13 having its end screw threaded and having the usual bushing 14 threaded on its inner end. In this particular case the cup 15 is circular in cross section and has no flanges at its lip, and is clamped against the outer face of the box 1 by means of a nut 16 cooperating with the bushing 14. As in the first embodiment, a compressor screw 17 is threaded through the side of the cup, but in this case the compressor plate 18 is curved to conform to the shape of the inner face of the circular cup.

The embodiment shown in Figs. 7 and 8 is similar to that shown in Figs. 1 to 3 and corresponding parts are correspondingly numbered. However the cup has no flanges and is secured to the box by means of screws 19 extending from the inside of the box through the cup and threading into the bottom of the cup. In this case, as in the other embodiments, the cup cannot be removed without access to the interior of the box. Obviously, the arrangement of Figs. 7, 8 and 9 is applicable to a conduit as well as to a cable, the screws 19 serving to hold the cup in assembled relation to the box irrespective of the presence of the conduit.

From the foregoing it will be evident that an important feature of the invention consists in means for clamping the sheet-metal cup to the box with the lip or rim of the cup seating against the box, whereby the sealing compound cannot escape between the rim of the cup and the box. In Figs. 1 to 3 the rivets 6 constitute the clamping means, in Figs. 4, 5 and 6 it is the nut 16 together with the nut threaded on the end of the conduit, and in Figs. 7 and 8 the clamping means comprise the screws 19.

It should be understood that the present disclosure is for the purpose of illustration only and that this invention includes all modifications and equivalents which fall within the scope of the appended claims.

I claim:

1. For sealing the crevice between an electical cable or conduit and an electrical connection box having an opening through which the cable or conduit enters the box, a sheet-metal cup having an opening in its bottom through which the cable or conduit is adapted to pass, there being a space surrounding the cable or conduit within the cup to receive sealing compound, means to clamp the cup to the box with the lip or rim of the cup seating against the box, a compressor plate extending along a portion of the inner face of the cup, and means extending through the cup to force the compressor plate away from said portion of the inner face of the cup to compress said compound snugly around the cable or conduit and against the box, thereby to seal the crevice between the cable or conduit and box.

2. For sealing the crevice between an electrical cable or conduit and an electrical connection box having an opening through which the cable or conduit enters the box, a sheet-metal cup having an opening in its bottom through which the cable or conduit is adapted to pass, there being a space surrounding the cable or conduit within the cup to receive sealing compound, means to clamp the cup to the box with the lip or rim of the cup seating against the box, a compressor plate extending along the inner face of one side of the cup, and means operative to force the compressor plate away from said side thereby to reduce the size of said space and compress said compound snugly around the cable or conduit and against the box, thereby to seal the crevice between the cable or conduit and box.

3. For sealing the crevice between an electrical conduit and an electrical connection box having an opening through which the cable or conduit enters the box, a sheet-metal cup having an opening in its bottom through which the cable or conduit is adapted to pass, there being a space surrounding the cable or conduit within the cup to receive sealing compound, a flange at the lip or rim of the cup, the flange having an opening to receive means for attaching the cup to the box with said flange seating against the box, a compressor plate extending along a portion of the inner face of the cup, and means extending through the wall of the cup to force the compressor plate away from said portion of the inner face of the cup thereby to compress said compound snugly around the cable or conduit and against the box so as to seal the crevice between the cable or conduit and the box.

4. For sealing the crevice between an electrical cable or conduit and an electrical connection box having an opening through which the cable or conduit enters the box, a sheet-metal cup having an opening in its bottom through which the cable or conduit is adapted to pass, there being a space surrounding the cable or conduit within the cup to receive a body of plastic sealing compound, the cup having threaded openings to receive screws extending from the inside of the box into the cup for securing the cup to the box with the lip or rim of the cup seating against the box, a compressor plate extending along a portion of the inner face of the cup, and means extending through the wall of the cup to force the compressor plate away from said portion of the inner face of the cup to compress said compound snugly around the cable or conduit and against the box, thereby to seal the crevice between the cable or conduit and the box.

5. In combination, an electrical conduit, an electrical connection box having an opening through which the cable or conduit enters the box, a sheet-metal cup having an opening in its bottom through which the cable or conduit passes, there being a space surrounding the cable or conduit within the cup, sealing compound in said space, means clamping the cup to the box with the lip or rim of the cup seating against the box, a compressor plate extending along a portion of the inner face of the cup, and a screw extending through a threaded opening in the wall of the cup and operative to force the compressor plate away from said portion of the inner face of the cup so as to compress said compound snugly around the cable or conduit and against the box, thereby to seal the crevice between the cable or conduit and the box.

6. The combination of an electrical cable or conduit and an electrical connection box having an opening through which the cable or conduit enters the box, a cup having an opening in its bottom through which the cable or conduit passes, there being a space surrounding the cable or conduit within the cup, sealing compound in said space, means attaching the cup to the box with the lip or rim of the cup seating against the box, a compressor plate extending along a portion of the inner face of the cup, and means extending through the cup to force the compressor plate away from said portion of the inner face of the cup, to compress said compound snugly around the cable or conduit and against the box, thereby to seal the crevice between the cable or conduit and box.

ERNEST G. JOHANSSON.